(12) United States Patent
Parrish et al.

(10) Patent No.: US 11,542,948 B2
(45) Date of Patent: Jan. 3, 2023

(54) SCAVENGING CENTRIFUGAL BAFFLE PUMP

(71) Applicant: GM Global Technology Operations LLC, Detroit, MI (US)

(72) Inventors: Robert Parrish, White Lake, MI (US); Samuel Sherman, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 802 days.

(21) Appl. No.: 16/397,313

(22) Filed: Apr. 29, 2019

(65) Prior Publication Data

US 2020/0340475 A1    Oct. 29, 2020

(51) Int. Cl.
| | |
|---|---|
| F04D 5/00 | (2006.01) |
| F16N 13/20 | (2006.01) |
| F04D 29/42 | (2006.01) |
| F04D 13/12 | (2006.01) |
| F04D 13/16 | (2006.01) |
| F04D 1/12 | (2006.01) |

(52) U.S. Cl.
CPC .................. *F04D 5/00* (2013.01); *F04D 1/12* (2013.01); *F04D 13/12* (2013.01); *F04D 13/16* (2013.01); *F04D 29/4293* (2013.01); *F16N 13/20* (2013.01)

(58) Field of Classification Search
CPC ... F04D 5/00; F04D 1/12; F04D 13/12; F04D 13/16; F04D 29/4293; F04D 1/00; F04D 13/14; F04D 29/426; F16N 13/20; F16H 57/04
See application file for complete search history.

(56) References Cited

U.S. PATENT DOCUMENTS

| | | | | |
|---|---|---|---|---|
| 877,485 | A | * | 1/1908 | Brooks ..................... F04D 1/12 |
| | | | | 415/89 |
| 4,806,083 | A | * | 2/1989 | LaGrange ............. F04D 29/426 |
| | | | | 417/DIG. 1 |
| 5,807,067 | A | * | 9/1998 | Burdick .................... F04D 1/12 |
| | | | | 417/423.1 |
| 9,772,027 | B2 | * | 9/2017 | Preston ............... F16H 57/0409 |
| 2015/0316142 | A1 | * | 11/2015 | Steward ............. F16H 61/0025 |
| | | | | 184/6.12 |

(Continued)

FOREIGN PATENT DOCUMENTS

| | | | |
|---|---|---|---|
| CN | 108884930 A | | 11/2018 |
| DE | 4434020 | * | 4/1995 |

(Continued)

OTHER PUBLICATIONS

English translation of DE4434020A1, captured from Espacenet on Jun. 10, 2022. (Year: 2022).*

*Primary Examiner* — Bryan M Lettman

(74) *Attorney, Agent, or Firm* — Vivacqua Crane, PLLC

(57) ABSTRACT

A scavenging centrifugal baffle pump. The scavenging centrifugal baffle pump includes a main pump, which includes a pump housing. The scavenging centrifugal baffle pump further includes a baffle connected to the main pump housing and defines defining an interior volume. The scavenging centrifugal baffle pump also includes a gear coupled to the main pump at least partially located in the interior volume of the baffle, a reservoir defined in the interior volume of the baffle, an inlet defined in the baffle adjacent to the reservoir and an elongate passage defined by the baffle.

20 Claims, 8 Drawing Sheets

(56) References Cited

U.S. PATENT DOCUMENTS

| | | | |
|---|---|---|---|
| 2017/0030457 A1* | 2/2017 | Hotait | F16H 57/0463 |
| 2018/0066746 A1* | 3/2018 | Kim | F16H 57/0453 |
| 2019/0120369 A1* | 4/2019 | Staake | F16H 57/045 |
| 2021/0006132 A1* | 1/2021 | Steinz | F16H 57/0415 |

FOREIGN PATENT DOCUMENTS

| | | |
|---|---|---|
| DE | 4434020 A1 | 4/2004 |
| DE | 102015207810 A1 | 3/2016 |
| DE | 102016211226 B3 | 6/2017 |

* cited by examiner

SCAVENGING CENTRIFUGAL BAFFLE PUMP

INTRODUCTION

The present disclosure relates to a scavenging centrifugal baffle pump.

Hybrid vehicle technology is driven by a number of factors including reduced tailpipe admissions and improved mileage. Hybrid technology relies both upon an internal combustion engine and an electric motor for propelling the vehicle. Various configurations of hybrid drive trains are available. In one such configuration, the electric motor is placed in series between the internal combustion engine and the transmission.

Many of the components in the drive system, including the transmission, internal combustion engine, and electric motor need to be lubricated, cooled or both; requiring supply and storage systems for each component. For example, in the case of a transmission, transmission oil lubricates the transmission, keeps the transmission cool, and, in the case of automatic transmission systems, using automatic transmission oil to transfer power. Pumps are used to supply transmission oil to the transmission from a main sump. A main pump, e.g., includes a pump housing and is driven by the internal combustion engine through a gear that is external to the pump housing via a gear train or other drive mechanism, such as a belt or pulley. The gear is often protected by a baffle, which keeps debris from damaging the gear. The internal combustion engine is separately lubricated with engine oil, which is also supplied by pumps, often from a main engine oil sump located at the bottom of the crankcase. Further, the internal combustion engine is cooled using various coolants, such as radiator coolant that often includes antifreeze supplied from its own separate system of pumps and sumps. In addition, the electric motor and battery may require cooling, which brings about another set of pumps and sumps, depending on how the motor is cooled. The various sumps and pumps for each system may increase the weight and complexity of a vehicle.

Thus, while current transmission oil pumps achieve their intended purpose, there is a need for a new and improved system and method for circulating transmission oil through hybrid engine systems.

SUMMARY

According to several aspects, the present disclosure relates to a scavenging centrifugal baffle pump. The scavenging centrifugal baffle pump includes a main pump including a pump housing, a gear external to the pump housing coupled to the main pump, and a baffle connected to the main pump housing defining an interior volume. The gear is at least partially located in the interior volume of the baffle. The scavenging centrifugal baffle pump further includes a reservoir defined in the interior volume of the baffle, an inlet defined in the baffle adjacent to the reservoir, an opening defined in the baffle, and an elongate passage defined by the baffle including an outlet. The opening defined in the baffle exposes a portion of the gear and the elongate passage connects the interior volume of the baffle with the outlet.

In an additional aspect of the present disclosure, the baffle is formed from at a first baffle piece connected to a second baffle piece.

In a further aspect of the present disclosure, the first baffle piece and the second baffle piece are connected together by an interference fit.

In a further aspect of the present disclosure, the second baffle piece is connected to the pump.

In a further aspect of the present disclosure, the elongate passage is defined by the first baffle piece and the second baffle piece.

In an additional aspect of the present disclosure, the baffle defines an interior side wall that is at least partially concentric to a periphery of the gear and a first clearance is defined between the first side wall and the periphery of the gear.

In additional aspect of the present disclosure, the baffle includes a first interior face and the gear includes a first face, and a second clearance is defined between the first interior face of the baffle and the first face of the gear.

In a further aspect of the present disclosure, the baffle includes a second interior face, opposing the first interior face, and the gear includes a second face opposing the first gear face, and a third clearance is defined between the second interior face of the baffle and the second face of the gear.

In an additional aspect of the present disclosure an internal combustion engine is coupled to the gear by a gear train, wherein the gear train engages the exposed portion of the gear.

In an additional aspect of the present disclosure the inlet is coupled to a secondary sump and the outlet is coupled to a main sump.

In an additional aspect of the present disclosure, the main pump is coupled to the main sump and the electric motor.

In a further aspect of the present disclosure, the main pump is coupled to the transmission.

In an additional aspect of the present disclosure, the gear includes a face and the face includes a plurality of vanes extending therefrom.

According to several aspects the present disclosure relates to a system for circulating transmission oil in a hybrid engine. The system includes an electric motor including an inlet and an outlet, a main sump coupled to the electric motor inlet by a first passageway, a secondary sump coupled to the electric motor outlet by a second passageway, and a main pump connecting the main sump to the first passageway, the main pump including a pump housing and a gear external to the pump housing. The system further includes a scavenging pump including the gear and a baffle defining an interior volume connected to the pump housing, wherein at least a portion of the gear is positioned in the interior volume, an inlet defined in the baffle coupling the interior volume of the baffle to the secondary sump, and an elongate passage extending from the baffle coupling the interior volume of the baffle to the main sump.

In an additional aspect of the present disclosure, the system further includes an internal combustion engine, wherein the internal combustion engine is coupled to the gear.

In further aspects of the present disclosure, the internal combustion engine is coupled to the electric motor.

In further aspects of the present disclosure, the main pump is coupled to a transmission and the transmission is coupled to the electric motor.

According to several aspects, the present disclosure relates to a method of circulating transmission oil through a hybrid engine. The method includes driving a main pump with a gear coupled to the main pump, wherein the main pump includes a pump housing and the gear is external to the pump housing, and supplying transmission oil from a main sump to an electric motor with the main pump. The method further includes collecting the transmission oil from the electric motor in a secondary sump and pumping the transmission oil from the secondary sump into the main sump with a scavenging pump including the gear and a baffle in which the gear is positioned.

In additional aspects of the present disclosure, the gear is driven by an internal combustion engine.

In additional aspect of the present disclosure, the method further includes supplying the transmission oil with the main pump from the main sump to a transmission coupled to the electric motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
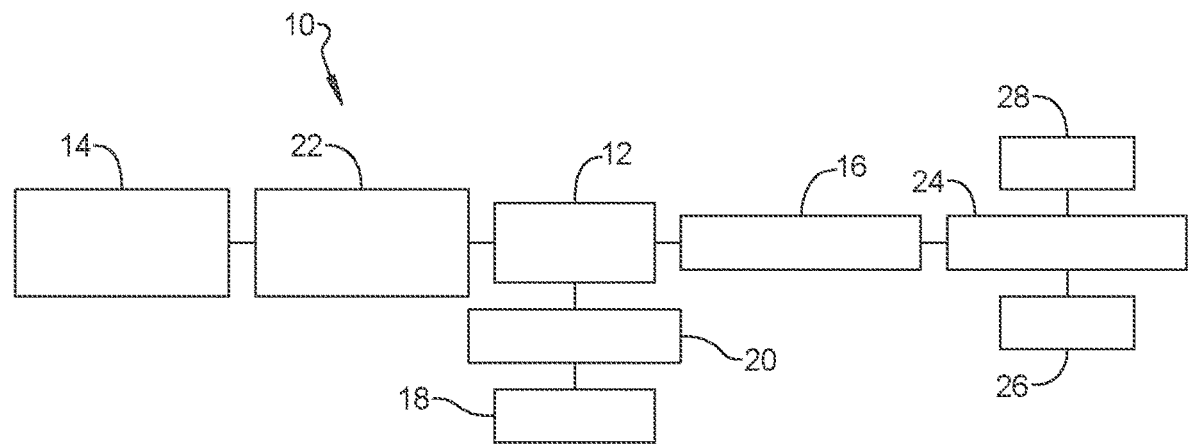
FIG. 1A is a schematic diagram of a hybrid drive train according to an exemplary embodiment.

As noted above, hybrid engine technology relies both upon an internal combustion engine and an electric motor to propel the vehicle. Various configurations of hybrid vehicle drive trains are available. FIG. 1A illustrates a configuration of a hybrid engine 10 with a series hybrid drive. The electric motor 12 is placed in series between the internal combustion engine 14 and the transmission 16. The internal combustion engine 14 is coupled to the electric motor 12 and drives the electric motor 12 to generate electricity. The electric motor 12 is, in turn, coupled to the transmission 16 and drives the transmission 16. It may be appreciated that internal combustion engine 14 may be coupled to the electric motor 12 directly or indirectly. In the illustrated aspect, the internal combustion engine 14 is coupled to a torque converter 22 or clutch by the crankshaft in the internal combustion engine 14, which is in turn coupled to the electric motor 12. Similarly, the electric motor 12 may be coupled to the transmission 16 directly or indirectly. As illustrated, the transmission 16 is coupled to the electric motor 12. The transmission 16 is coupled to the differential 24, which is in turn coupled to the wheels 26, 28. The various couplings described above include mechanical, hydraulic or combinations of mechanical and hydraulic couplings as would be understood by a person having ordinary skill in the art.

A battery 18 is also included to provide power to the electric motor 12 or store power generated by the electric motor 12. Various electronics 20, such as a pulse-controlled inverter, are provided to control the storage and, or supply of power from the battery 18 are also provided. The battery 18, electronics 20, and electric motor 12 are coupled to each other by electrically conductive wires. In alternative aspects, other arrangements of the hybrid drive system may be employed, including parallel hybrid drive systems. Further, the systems may alternatively include more than one electric motor.

Figure 1B:
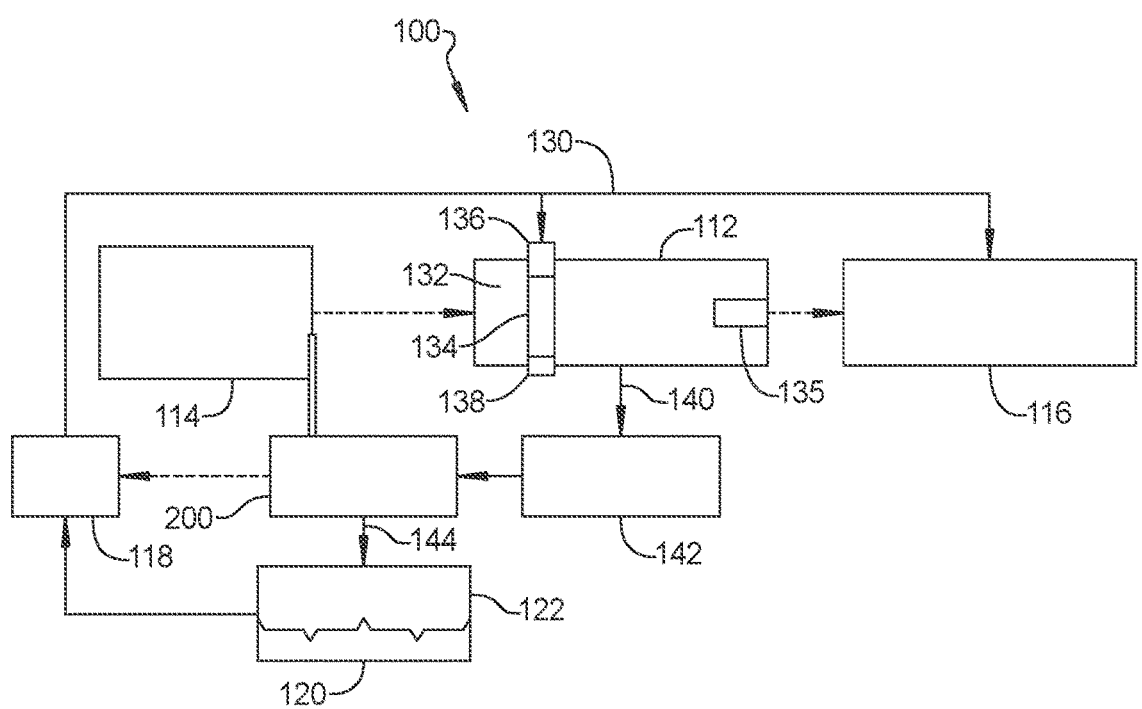
FIG. 1B is a schematic diagram of transmission oil circulation system for a hybrid engine including a scavenging centrifugal baffle pump integrated with a main pump according to an exemplary embodiment, wherein solid lines indicate fluid passageways and double dotted lines indicate mechanical or hydraulic couplings that transfer power.

Referring now to FIG. 1B, which illustrates an aspect of transmission oil circuit 100. Transmission oil 120 is delivered to the transmission 116 and acts as a lubricant and assists in cooling the transmission 116. In the aspects including automatic transmission oil 120, the transmission oil 120 acts a hydraulic fluid as well, facilitating power transfer from the electric motor 112 to the transmission 116. A main pump 118 delivers the transmission oil 120 from the main sump 122 to the transmission 116 via a first passageway 130 to which the main pump 118 and the transmission are connected to. Further, the transmission oil 120 is also delivered to the electric motor 112, and the electric motor housing 132, via the first passageway 130 to cool the electric motor 112. In aspects, the electric motor housing 132 includes one or more passageways 134 that carry the transmission oil 120 in the electric motor housing 132 around the motor components. Additionally, or alternatively, the transmission oil may be passed through the components of the electric motor, such as through the rotor 135. The first passageway 130, e.g., is connected to one or more electric motor inlets 136 defined in the electric motor housing 132 and a second passageway 140 is coupled to one or more electric motor outlets 138 defined in the electric motor housing 132. The transmission oil 120 leaves the electric motor housing 132 through the electric motor outlets 138 and flows through the second passageway 140 into an upper, secondary sump 142. The transmission oil 120 is then delivered from the secondary sump 142 to the main sump 122 through an additional passageway 144 by the scavenging pump 200, which is integrated with the main pump 118.

In aspects, illustrated in FIGS. 2 through 5, the scavenging pump 200 is a centrifugal baffle pump that includes the drive gear 202 coupled to the main pump 118 and a baffle 204, which covers a portion of the gear 202. The gear 202 rotates around the center axis CA and acts as an impeller driving the transmission oil out of the baffle 204. Also illustrated in FIG. 2, the gear 202 is coupled to the main pump 118 external to the pump housing 203. In aspects, the gear 202 includes a splined inner opening 210, wherein the splines 212 mate with splines 214 on a drive shaft 216 that enters the pump housing 203 to drive a pump mechanism in the main pump 118, such as a gear pump. It may be appreciated that other mechanical, rotational interlocks between the inner opening 210 of the gear 202 and the drive shaft 216 maybe provided instead of, or in addition, to the splines 212, 214.

Referring back to FIGS. 2 through 5, the baffle 204 defines an interior volume 218 in which at least a portion of the gear 202 is located. In aspects, the baffle 204 is formed from a first baffle piece 222 and a second baffle piece 224. The two baffle pieces 222 and 224 are connected together and in particular aspects, the connection resists leaking of transmission oil from the interior volume 218. In aspects, an interference fit, such as a snap-fit or a press-fit, is formed between the baffle pieces 222, 224. For example, the first baffle piece 222 includes a tab 226 that interlocks in an undercut 228 formed in the second baffle piece 224. In aspects, the baffle 204 is molded by injection molding or other molding techniques from a thermoplastic material such as nylon 6. The thermoplastic material, in further aspects, exhibits a service temperature in the range of minus 50 degrees C. to 150 degrees C. Further, a seal (not illustrated) may be placed around or between the baffle pieces 222, 224 to prevent leakage.

The baffle 204 further defines an opening 230 that exposes a portion of the gear 202. The opening 230 is located at the top 232 of the baffle 204 proximal to the gear 202. Located near the bottom 234 of the baffle 204 is a reservoir 236, where the curvature of the baffle 204 does not follow the curvature of the gear 202 and exhibits a greater distance $d_1$ between the gear 202 and the interior side wall 231 of the baffle 204 than the distances $d_2$, $d_3$ between the gear 202 and baffle 204 adjoining either side 242, 244 of the reservoir 236. As illustrated, the distances $d_2$, $d_3$ on either side of the reservoir 236 are the same. However, it may be appreciated that the distances $d_2$, $d_3$ may alternatively be different. Further, it may be appreciated that at least a portion of the interior side wall 231 is concentric to the gear 202 periphery 262 at the adjoining side 242 of the reservoir 236 adjacent to the outlet 258 described later herein, which provides a first clearance $C_1$ for pumping transmission fluid. In aspects, the distances $d_2$ and $d_3$ are individually in the range of 1 mm to 6 mm including all values and ranges therein, and distance $d_1$ is in the range of 3 mm to 20 mm including all values and ranges therein.

Figure 2:
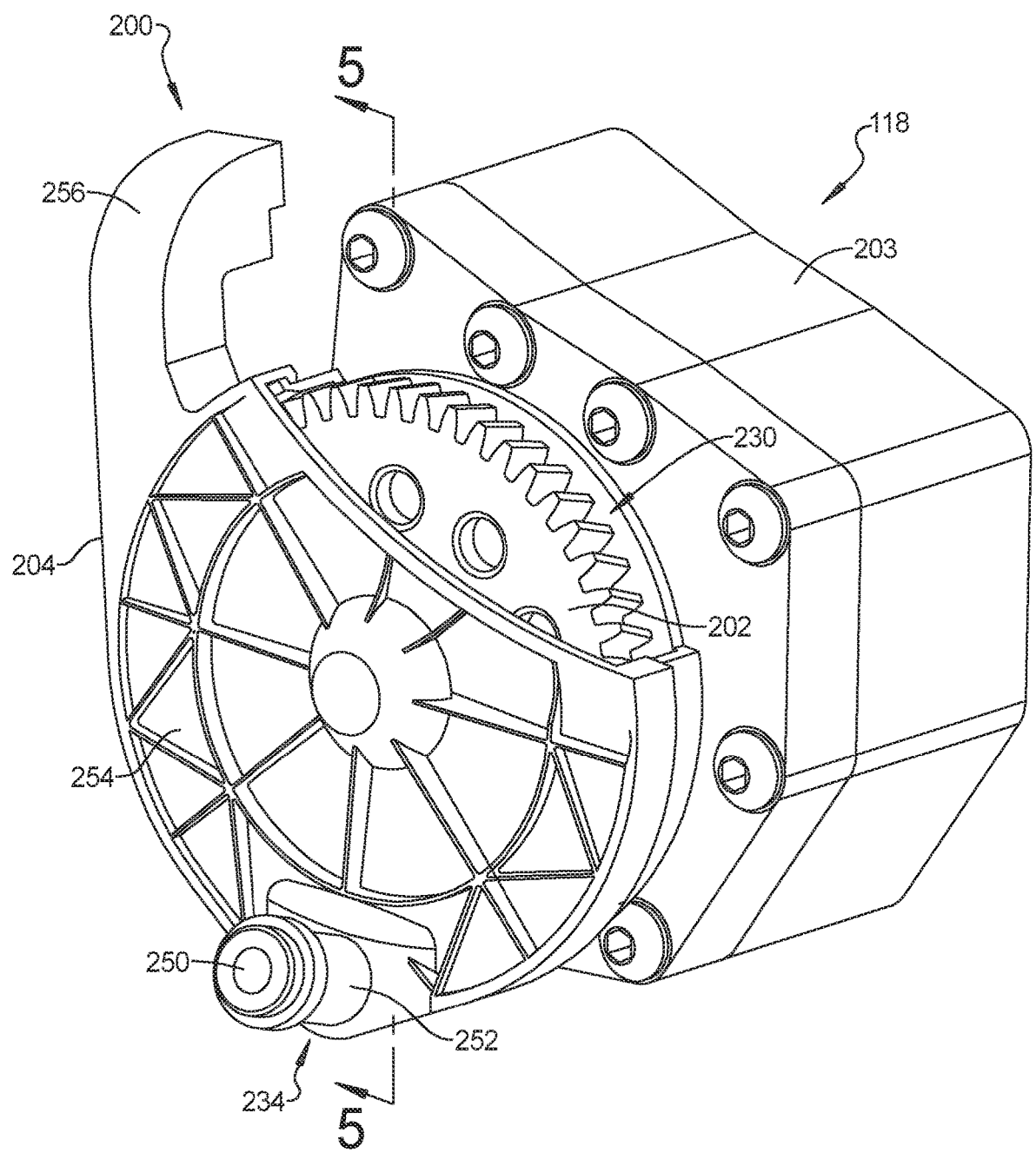
FIG. 2 is a perspective view of a scavenging pump integrated with a main pump according to an exemplary embodiment.
Figure 5:
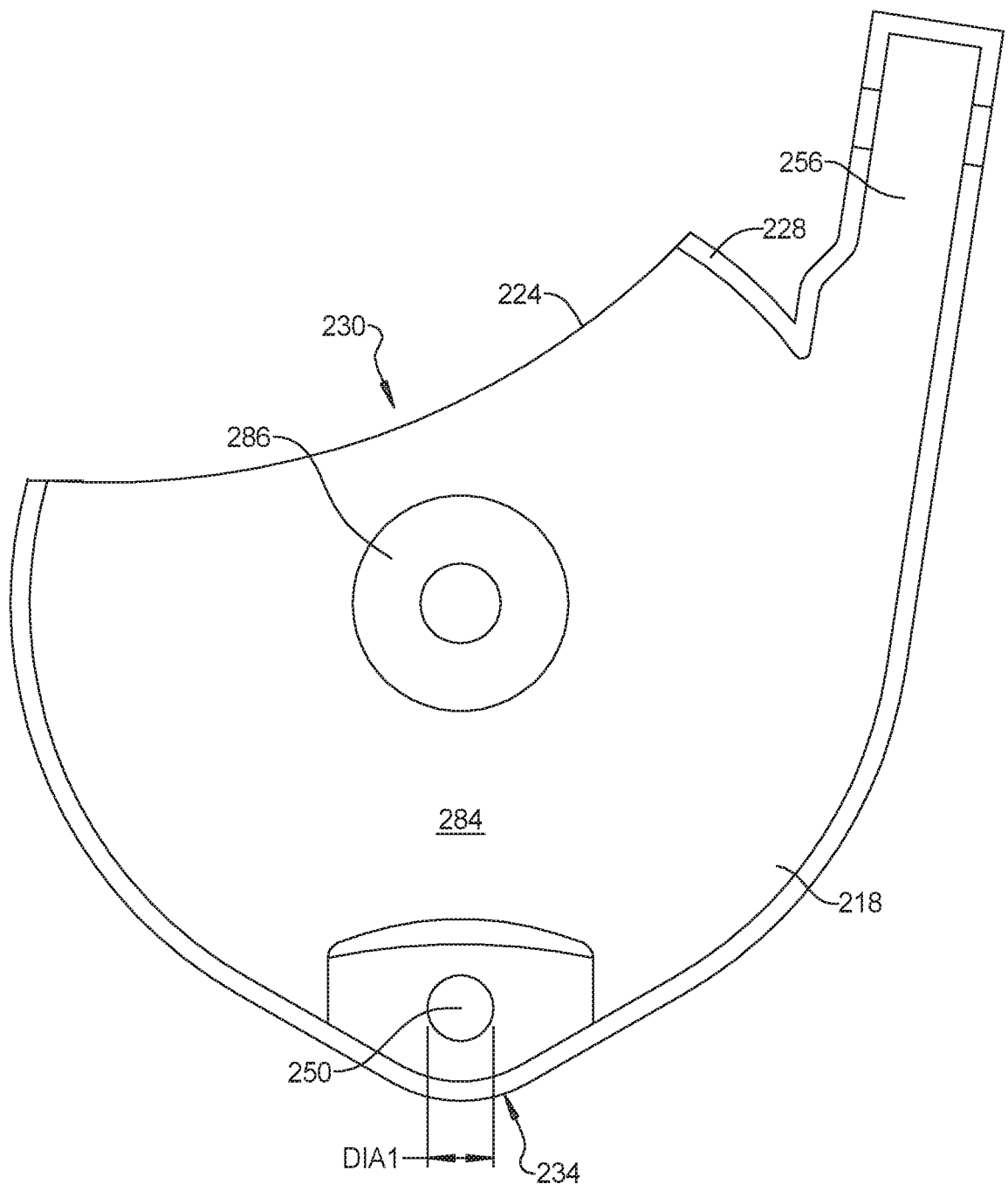
FIG. 5 is an interior view of the second baffle piece.

As illustrated in FIGS. 2 and 5, an inlet 250 is formed proximal to the bottom 234 of the baffle 204 and reservoir 236. The inlet 250 is coupled to the second passageway 140 (illustrated in FIG. 1B). As illustrated, the inlet 250 is formed in the second baffle piece 224. The inlet 250 may include an oblique cylindrical projection 252 extending from the front face 254 of the baffle. Further, the inlet 250 may exhibit a first diameter DIA1 in the range of 2 mm to 5 mm, including all values and ranges therein.

Figure 3:
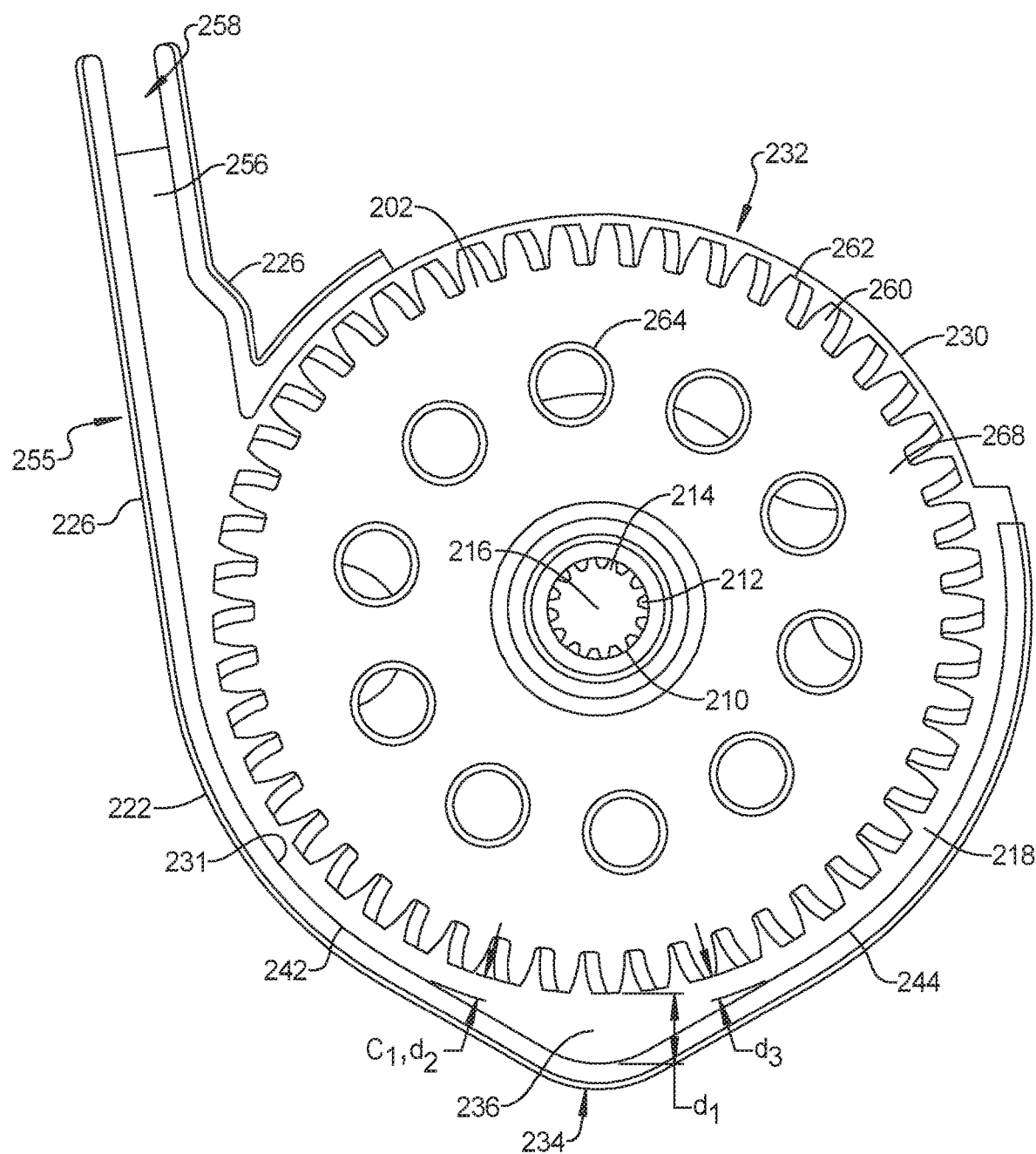
FIG. 3 is a front view of a gear seated in the first baffle piece of a scavenging pump, with the second baffle piece removed, according to an exemplary embodiment.

In addition, as illustrated in FIGS. 2, 3 and 5, the baffle 204 includes an elongate passage 256 extending upward from one side 255 of the baffle 204. The elongate passage 256 defines an outlet 258, shown in FIG. 7, through which transmission oil 120 is ejected. The elongate passage 256 connects the interior volume 218 of the baffle 240 with the outlet 258. As illustrated, the elongate passage 256 is also formed from the first baffle piece 222 and the second baffle piece 224; however a third baffle piece may alternatively be employed. Also illustrated, the elongate passage 256 extends up beyond the top 232 of the remainder of the baffle 204 proximal to the gear 202.

Figure 4:
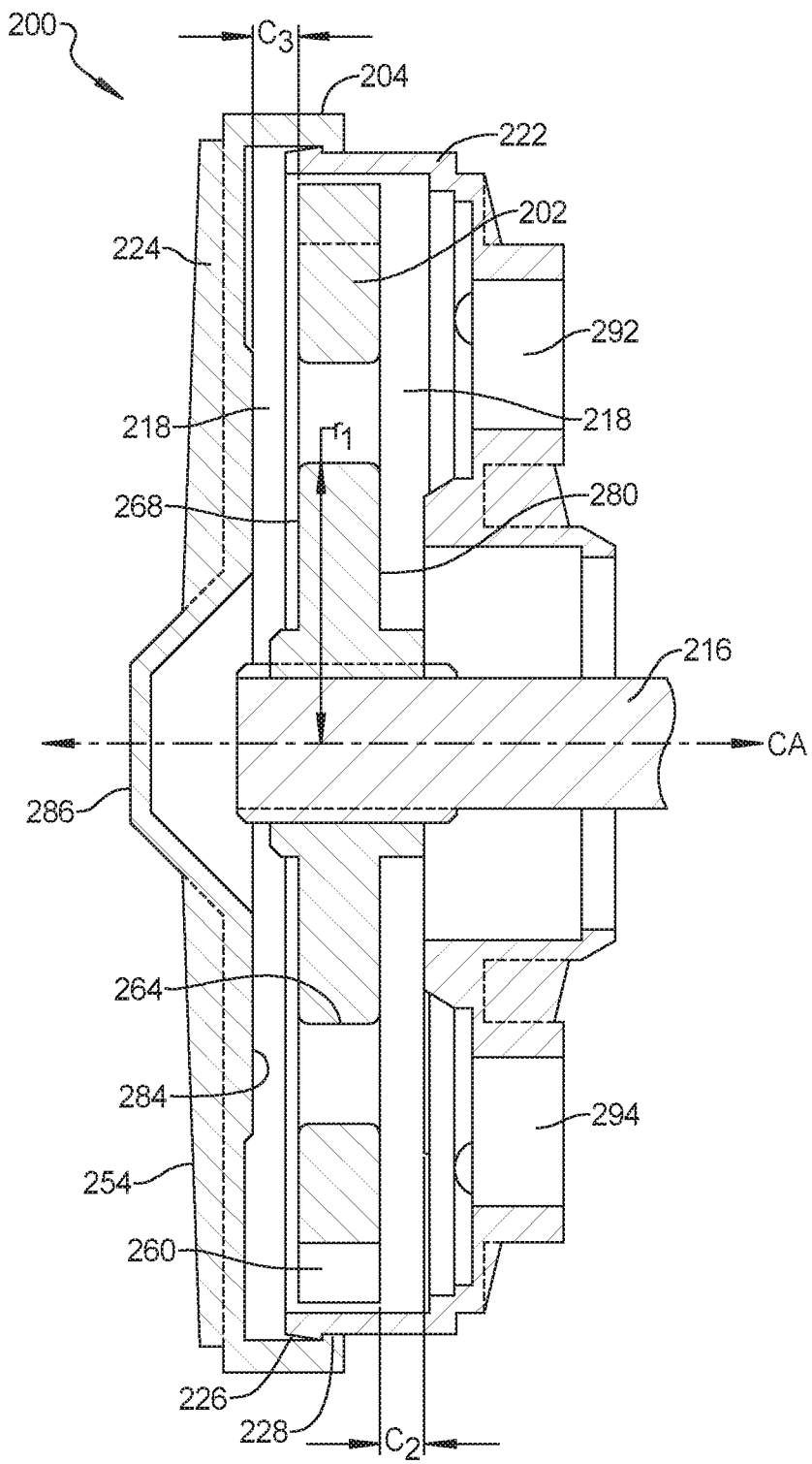
FIG. 4 is a cross-sectional view of the scavenging pump of FIG. 2 including the gear and the baffle according to an exemplary embodiment.

Turning now to FIGS. 3 and 4, the gear 202 includes a plurality of teeth 260 formed around the periphery 262 of the gear. The gear 202 further includes a plurality of holes 264 positioned around the center axis CA of the gear 202. These holes 264 may reduce the weight of the gear 202. It may be appreciated that, in alternative aspects, the holes 264 may be omitted. Further, while the holes 264 are illustrated as being at the same radial distance r1 from the center axis CA of the gear 202 around the gear front face 268, the holes 264 may be positioned at varying radii around the gear front face 268. In addition, any number of holes of a single size or varying sizes may be present, including from one to 20 holes.

Figure 6:
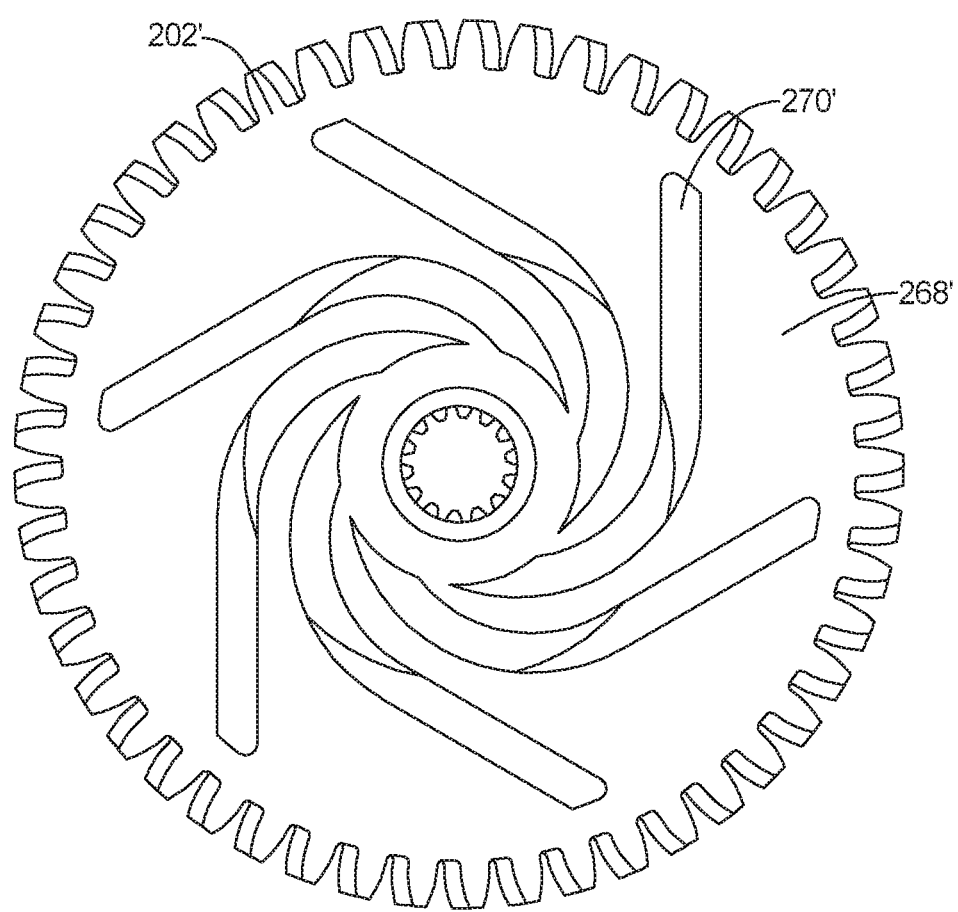
FIG. 6 is a gear including a number of vanes projecting from a face of the gear according to an exemplary embodiment.

FIG. 6 illustrates another embodiment of a gear 202' including a plurality of vanes 270' projecting from the front face 268' of the gear 202'. FIG. 6 illustrates six arcuate vanes 270' projecting from the front face 268' of the gear 202'; however it may be appreciated that less than 6 or more than 6 vanes may be present, such that there may be in the range of 3 to 30 vanes projecting from the front face 268' of the gear 202'. It may further be appreciated that the vanes may project from the rear face 280 of the gear 202, see FIG. 4.

Turning again to FIG. 4, a second clearance $C_2$ is present between the rear face 280 of the gear 202 and interior face 282 of the first baffle piece 222. In addition, a third clearance $C_3$ is present between the front face 268 of the gear 202 and the interior face 284 of the second baffle piece 224. The first and second clearances may be the same or may be different. The second clearance $C_2$ and the third clearance $C_3$ may individually be selected from the range of 1 mm to 6 mm, including all values and ranges therein, at the minimum distance between each face 268, 280 of the gear 202 and the interior faces 284, 282 of the baffle 204, respectively. Further, each clearance $C_2$, $C_3$ may increase in size by 0.25 mm to 3 mm across each face 268, 280 of the gear 202.

It is also noted that FIG. 4 illustrates an aspect in which the second baffle piece 224 defines a bowl 286, which is concave at the interior face 284 and convex at the exterior first face 354 of the second baffle piece 224. This provides clearance for the drive shaft 216 in aspects where the drive shaft 216 extends through the gear 202.

Figure 7:
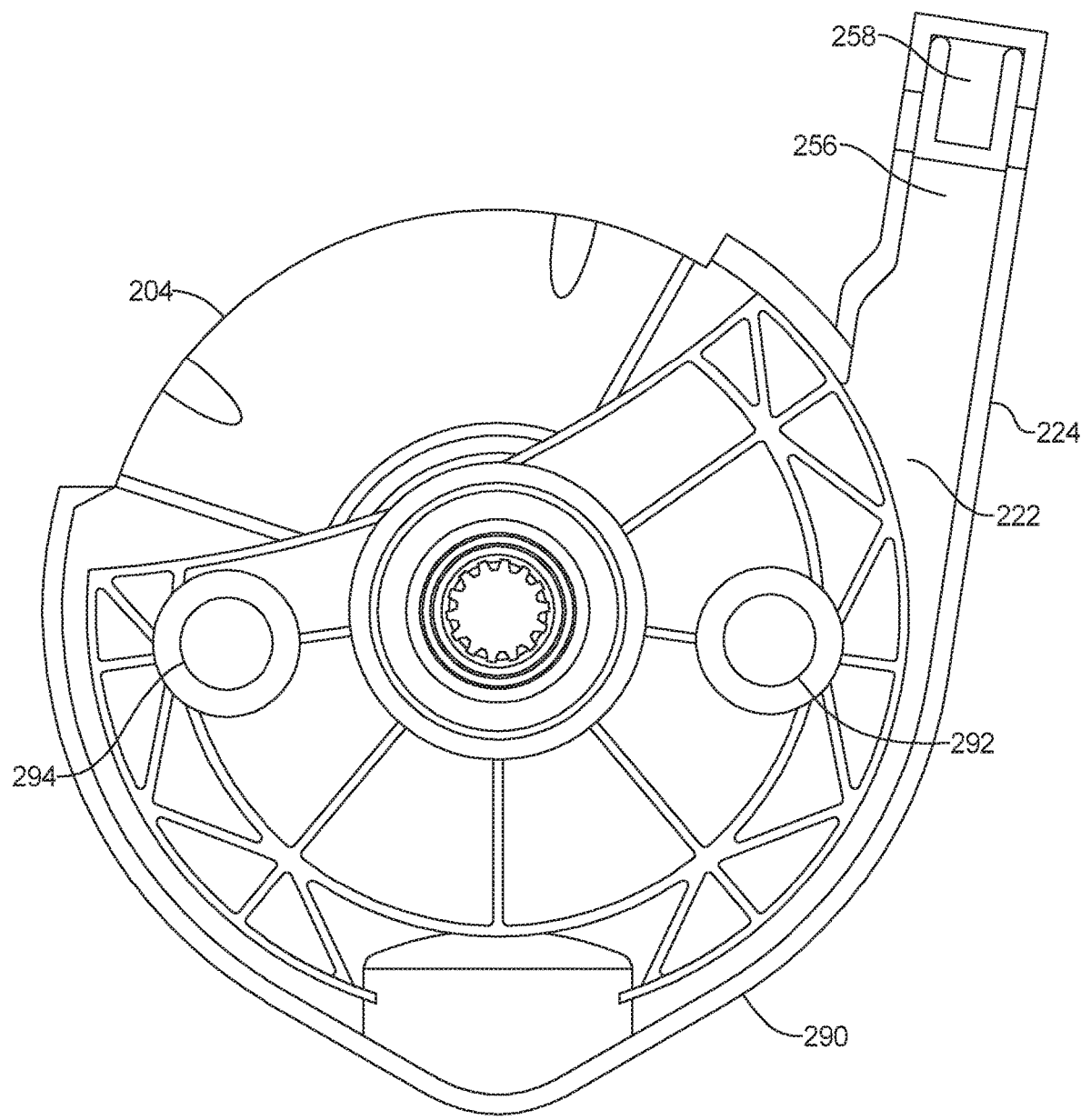
FIG. 7 is a rear view of the scavenging pump according to an exemplary embodiment.

With reference now to FIG. 7, the first baffle piece 222 includes an opening 90 defined therein to accommodate the drive shaft 216 (illustrated in FIGS. 3 and 4). Further, the first baffle piece 222 includes two openings 292, 294 (also illustrated in FIG. 4) spaced from the center axis CA of the gear 202 (illustrated in FIG. 4), which accommodate mechanical fasteners (not illustrated) to affix the baffle 204 to the main pump 118.

Figure 8:
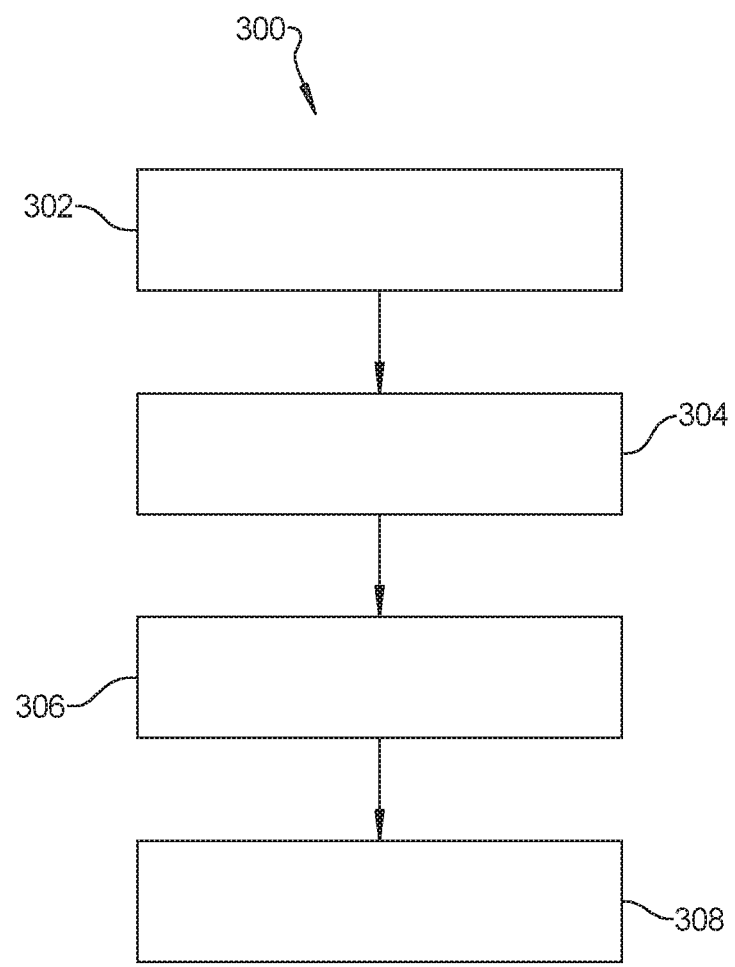
FIG. 8 a flow chart of a method according to an exemplary embodiment.

A method 300 of circulating transmission oil 120 through a hybrid engine 10 is illustrated in FIG. 8 and described with reference to FIGS. 1 through 7. In block 302, the main pump 118 is driven by the scavenging pump 200 gear 202; the gear 202 is driven by the internal combustion engine 114. In block 304, transmission oil 120 is supplied by the main pump 118, through the first passageway 130, to the electric motor 112 and transmission 116. In block 306, transmission oil 120 flows from the electric motor 112 through the second passageway 140, and is collected in the secondary sump 142. In block 308, the scavenging pump 200 then pumps the transmission oil 120 from the secondary sump 142 into the main sump 122.

A scavenging centrifugal baffle pump of the present disclosure offers several advantages. These include the ability to cool the electric motor as well as the main pump with transmission oil. These also include the ability to transfer transmission oil from a secondary sump to the main sump. These further include a reduction in the total number of components in the hybrid engine by allowing a single component to pump transmission oil in two separate directions. These yet further include the ability to convert an existing pump into the dual purpose pump described herein by modifying the baffle. Given this ability to modify an existing design, the scavenging pump design provides a relatively low cost, low risk alternative to the transfer of the transmission oil.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A scavenging centrifugal baffle pump, comprising:
a main pump including a pump housing;
a gear external to the pump housing coupled to the main pump;
a baffle connected to the main pump housing defining an interior volume and a bottom, the gear at least partially located in the interior volume;
a reservoir defined near the bottom of the interior volume of the baffle, wherein the baffle exhibits a baffle curvature and the gear exhibits a gear curvature and the baffle curvature does not follow the gear curvature at the reservoir;
an inlet defined in the baffle, the inlet comprising a cylindrical projection extending upward from a front face of the baffle at an oblique angle, the inlet including a first opening adjacent to the reservoir defined at the bottom of the interior volume of the baffle;
an opening defined in the baffle, wherein the opening exposes a portion of the gear; and
an elongate passage defined by the baffle including an outlet, wherein the elongate passage connects the interior volume of the baffle with the outlet.

2. The scavenging centrifugal baffle pump of claim 1, wherein the baffle is formed from a first baffle piece connected to a second baffle piece.

3. The scavenging centrifugal baffle pump of claim 2, wherein the first baffle piece and the second baffle piece are connected together by an interference fit.

4. The scavenging centrifugal baffle pump of claim 2, wherein the second baffle piece is connected to the main pump.

5. The scavenging centrifugal baffle pump of claim 2, wherein the elongate passage and outlet are defined by the first baffle piece and the second baffle piece, and wherein the outlet is positioned on the opposite side of the baffle from the inlet.

6. The scavenging centrifugal baffle pump of claim 1, wherein the baffle defines an interior side wall that is at least partially concentric to a periphery of the gear and a side wall clearance is defined between the interior side wall and the periphery of the gear.

7. The scavenging centrifugal baffle pump of claim 1, wherein the baffle includes a first interior face and the gear includes a first face, and a first clearance is defined between the first interior face of the baffle and the first face of the gear.

8. The scavenging centrifugal baffle pump of claim 7, wherein the baffle includes a second interior face, opposing the first interior face, and the gear includes a second face opposing the first gear face, and a second clearance is defined between the second interior face of the baffle and the second face of the gear.

9. The scavenging centrifugal baffle pump of claim 1, wherein an internal combustion engine is coupled to the gear by a gear train, wherein the gear train engages the exposed portion of the gear.

10. The scavenging centrifugal baffle pump of claim 1, wherein the inlet is coupled to a secondary sump and the outlet is coupled to a main sump.

11. The scavenging centrifugal baffle pump of claim 10, wherein the main pump is coupled to the main sump and an electric motor.

12. The scavenging centrifugal baffle pump of claim 1, wherein the baffle exhibits a greater distance between the gear and an interior side wall of the baffle at the reservoir than a distance between the gear and the baffle adjoining either side of the reservoir.

13. A system for circulating transmission oil in a hybrid engine, comprising:
an electric motor including an electric motor inlet and an electric motor outlet;
a main sump coupled to the electric motor inlet by a first passageway;
a secondary sump coupled to the electric motor outlet by a second passageway;
a main pump connecting the main sump to the first passageway, the main pump including a pump housing and a gear external to the pump housing; and
a scavenging pump including the gear and a baffle defining an interior volume and a bottom, the baffle connected to the pump housing, wherein at least a portion of the gear is positioned in the interior volume,
a reservoir defined near the bottom of the interior volume of the baffle, wherein the baffle exhibits a baffle curvature and the gear exhibits a gear curvature and the baffle curvature does not follow the gear curvature at the reservoir,
an inlet defined in the baffle coupling the interior volume of the baffle to the secondary sump, the inlet comprising a cylindrical projection extending upward from a front face of the baffle at an oblique angle, the inlet including a first opening adjacent the reservoir defined at the bottom of the interior volume, and
an elongate passage extending from the baffle coupling the interior volume of the baffle to the main sump.

14. The system of claim 13, further comprising an internal combustion engine, wherein the internal combustion engine is coupled to the gear.

15. The system of claim 14, wherein the internal combustion engine is coupled to the electric motor.

16. The system of claim 13, wherein the main pump is coupled to a transmission and the transmission is coupled to the electric motor.

17. The system of claim 13, wherein the baffle exhibits a greater distance between the gear and an interior side wall of the baffle at the reservoir than a distance between the gear and the baffle adjoining either side of the reservoir.

18. A method of circulating transmission oil through a hybrid engine, comprising:
driving a gear, wherein the gear is coupled to a main pump, wherein the main pump includes a pump housing and the gear is external to the pump housing;
supplying transmission oil from a main sump to an electric motor with the main pump;
collecting the transmission oil from the electric motor in a secondary sump; and
pumping the transmission oil from the secondary sump into the main sump with a scavenging pump including the gear and a baffle connected to the pump housing in which the gear is positioned, wherein the baffle defines an interior volume and a bottom, wherein at least a portion of the gear is positioned in the interior volume, a reservoir defined near the bottom of the interior volume of the baffle, wherein the baffle exhibits a baffle curvature and the gear exhibits a gear curvature and the baffle curvature does not follow the gear curvature at the reservoir, an inlet defined in the baffle coupling the interior volume of the baffle to the secondary sump, the inlet comprising a cylindrical projection extending upward from a front face of the baffle at an oblique angle, the inlet including a first opening adjacent the reservoir defined at the bottom of the interior volume, and an elongate passage extending from the baffle coupling the interior volume of the baffle to the main sump.

19. The method of claim 18, wherein the gear is driven by an internal combustion engine.

20. The method of claim 18, further comprising supplying the transmission oil with the main pump from the main sump to a transmission coupled to the electric motor.

\* \* \* \* \*